Oct. 26, 1954 E. SCHNEIDER 2,692,438
DEVICE FOR MEASURING OR GAUGING SCREW THREADS
Filed Dec. 1, 1952
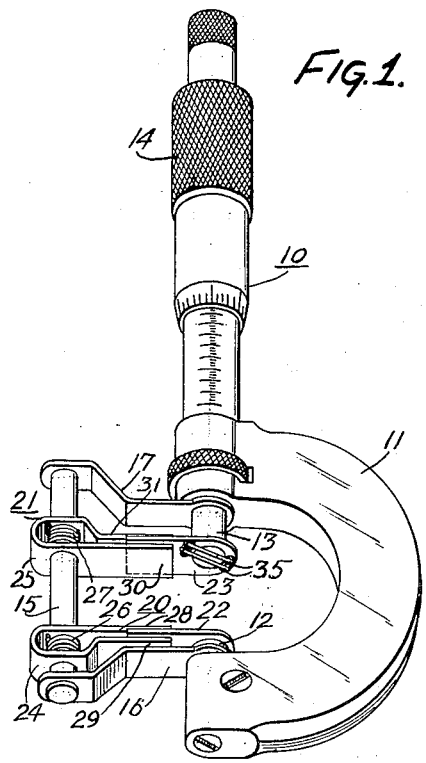
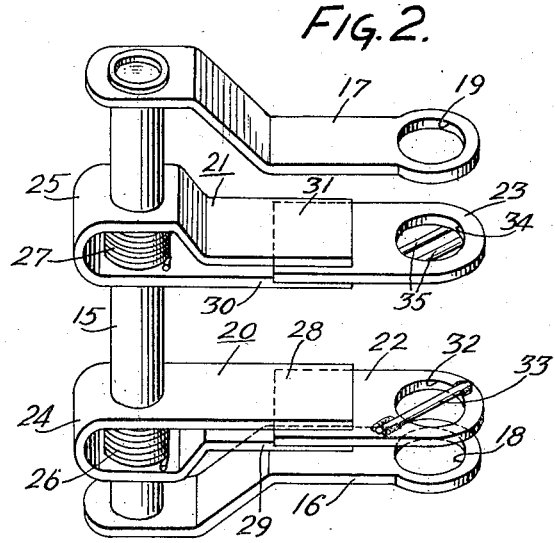
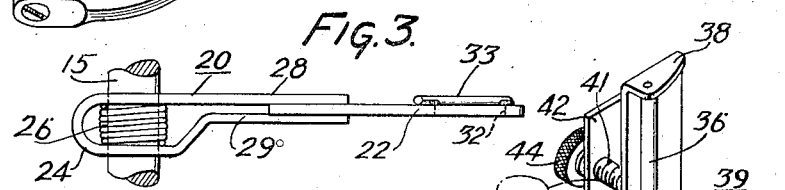
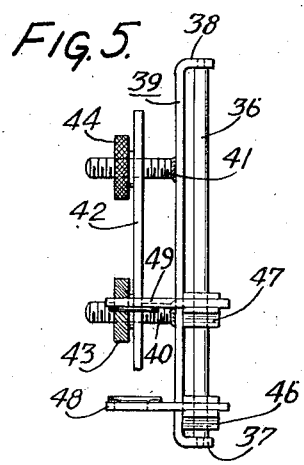
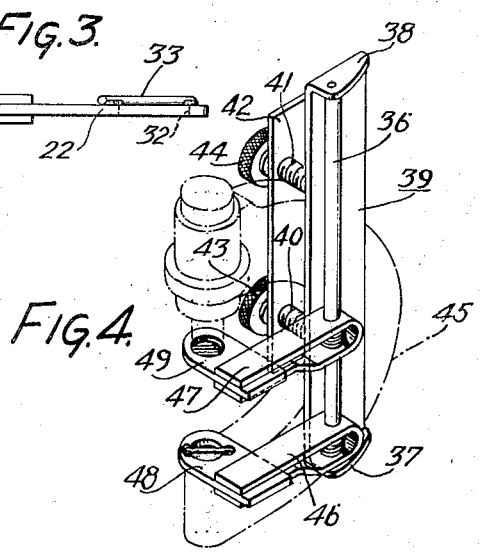
Inventor:
Emil Schneider Patented Oct. 26, 1954

2,692,438

UNITED STATES PATENT OFFICE 2,692,438

DEVICE FOR MEASURING OR GAUGING SCREW THREADS

Emil Schneider, Coatesville, Pa.

Application December 1, 1952, Serial No. 323,349

4 Claims. (Cl. 33—167)

This invention relates to devices for measuring or gauging screw threads by the three-wire method.

As well known to those skilled in the art, the three-wire method involves placing three wires in the thread groove, one wire on one side of the thread and two wires on the other side of the thread, and measuring or gauging over the wires by means of a micrometer. Different sized wires are used for the different sized screw threads. This method has been cumbersome and time-consuming in the past due to the fact that it involves handling of the three wires, the threaded member to be measured or gauged, and the micrometer. Moreover, the handling of very small wires in the case of small thread sizes has been especially difficult.

The principal object of the present invention is to obviate the difficulties incident to the practice of the three-wire method and to enable simple and easy practice thereof.

Another object of the invention is to provide a novel attachment for a micrometer which may be easily applied and which serves to hold the wires in cooperative association with the gauging elements of the micrometer.

A further object of the invention is to provide a simple and novel combination of an attachment to be mounted on a micrometer and wire-carrying elements for use with the attachment.

A further object of the invention is to provide novel wire-carrying elements for use with a holder.

The attachment provided by the invention comprises essentially a slide bar, means for mounting said bar on a micrometer so that it is disposed parallel to the axes of the aligned gauging elements of the micrometer, and a pair of holders slidably mounted on said bar and adapted to hold wire-carrying elements for the measurement or gauging of different sized screw threads.

The invention may be fully understood from the following description with reference to the accompanying drawing, in which Fig. 1 is a perspective view of one form of the attachment applied to a micrometer;

Fig. 2 is a perspective view of the same form of the attachment removed from the micrometer;

Fig. 3 is a side elevational view of one of the holder clips;

Fig. 4 is a perspective view of another form of the attachment, with a portion of a micrometer shown in phantom; and Fig. 5 is a side elevational view of the attachment.

Referring first to Figs. 1 to 3, there is shown in Fig. 1 a conventional micrometer 10 having a U-shaped frame 11, a stationary gauging element 12, and a movable gauging element which is moved by rotating the barrel 14.

In the form of the attachment shown in Figs. 1 and 2, there are provided a slide bar 15, arms 16 and 17 secured to the ends of the bar and having apertures 18 and 19 to fit freely over the gauging elements 12 and 13 against the frame 11, and holder clips 20 and 21 slidably mounted on bar 15 and adapted to hold wire-carrying elements, such as shown at 22 and 23.

The slide bar 15 is preferably circular in cross-section but it may be of any desired shape. The arms 16 and 17 are preferably formed of flat metal and are resilient. They may be bent as shown to accommodate the clips 20 and 21 in the form shown. Arms 16 and 17 may be secured to the slide bar 15 in any suitable manner, as by necking down each end of the bar to fit in an opening in each arm and riveting over the ends of the bar.

The clips 20 and 21 are also preferably formed of flat metal and are resilient. In the form shown the flat metal pieces forming the clips are bent as shown to provide U-shaped ends 24 and 25 which are apertured to fit snugly on bar 15 and to slide thereon. Within the U-shaped ends 24 and 25 are wires 26 and 27 spirally wound tightly about the bar 15 to provide frictional gripping of the bar so as to hold each clip in any position to which it is moved. The coiled wires need not be fastened to the clips.

The jaws 28, 29 and 30, 31 of the resilient clips serve to grip the wire-carrying elements. To measure or gauge different sized screw threads, it is necessary to provide a pair of wire-carrying elements for each screw size, having wires of proper size for the particular screw size. One element of the pair carries a single wire, while the other element carries two wires. The one micrometer attachment is used for measurement or gauging of various screw thread sizes within the range of the micrometer.

The pairs or sets of wire-carrying elements are typified by the elements 22 and 23 shown. These elements comprise flat pieces of metal insertable into the spring jaws of the holder clip. Element 22 has an aperture 32 to fit freely over the stationary gauging element 12 of the micrometer, and a wire 33 spanning the aperture at the upper side to rest against the flat face of element 12. The wire may be secured to its carrying element by welding or soldering. Element 23 has an aperture 34 to fit freely over the movable gauging element 13 of the micrometer, and a pair of wires 35 spanning the aperture at the lower side to rest against the flat face of element 13. Wires 35 are secured in any suitable manner, as by welding or soldering.

In using the device, the user has only to mount the wire-holder attachment on the micrometer, if it is not already mounted, then insert the proper pair or set of wire-carrying elements for the thread size to be measured or gauged, and then proceed with the measuring or gauging. In practice, manufactured pieces having screw threads are required to come within certain tolerances of a micrometer reading taken on a standard piece. Therefore, the most common usage of the device is the gauging of manufactured pieces to determine whether each piece comes within the required tolerances.

As the attachment and the associated wire-carrying elements serve to hold the wires on the micrometer, the practice of the three-wire method of measuring or gauging screw threads is greatly facilitated. The user has only to insert the threaded test piece between the gauging elements of the micrometer, and the procedure is as simple as the measuring or gauging of any piece by means of a micrometer.

It should be noted further that holder clips 20 and 21 may turn on bar 15, and the wire-carrying elements 22 and 23 may slide or turn in the jaws of the clips. This facilitates use of the device, as it effectively makes the wires self-adjusting to seat in the thread groove.

Some micrometers have a very short stationary gauging element which will not accommodate the attachment shown in Figs. 1 and 2. For use with such a micrometer the attachment shown in Figs. 4 and 5 is provided. In this form, the slide bar 36 is secured at its ends to the turned ends 37 and 38 of a bracket 39. Secured to the bracket 39 are spaced screw shanks 40 and 41 which freely receive a clamping strip 42 having spaced apertures to accommodate the screw shanks. The bracket 39 and strip 42 form a clamp which is tightened by nuts 43 and 44. The clamp is adapted to be placed as shown on the frame of a micrometer shown in phantom at 45. The clamp embraces the upper part of the micrometer frame and is rigidly secured thereto. The holder clips 46 and 47 and the wire-carrying elements 48 and 49 are similar to the corresponding elements in Figs. 1 and 2 and function in the same way. It will be noted that in this instance the stationary gauging element of the micrometer is required only to accommodate the lower wire-carrying element.

The device of Figs. 4 and 5 is used in the same manner as the device of Figs. 1 to 3, as previously described.

While certain forms of the invention have been illustrated and described for the purpose of disclosure, the invention is not limited thereto but contemplates such other forms and modifications as may occur to those skilled in the art.

I claim:

1. An attachment for a micrometer to enable measuring or gauging of screw threads by the three-wire method, comprising a slide bar in the form of a rod of circular cross-section, means for mounting said bar on a micrometer so that the bar is parallel to the axes of the aligned gauging elements of the micrometer, and a pair of holders slidably mounted on said bar and adapted to hold wire-carrying elements in cooperative association with the gauging elements of the micrometer, each of said holders having an apertured U-shaped portion slidable along said bar and spring jaws extending from said portion.

2. A device according to claim 1, including a friction element embracing said slide bar within the U-shaped portion of each holder.

3. An attachment for a micrometer to enable measuring or gauging of screw threads by the three-wire method, comprising a slide bar, a pair of arms extending from the ends of said bar and apertured to fit over the gauging elements of a micrometer, whereby to mount said bar on the micrometer so that the bar is parallel to the axes of the aligned gauging elements of the micrometer, and a pair of holders slidably mounted on said bar and adapted to hold wire-carrying elements in cooperative association with the gauging elements of the micrometer.

4. A combination for use with a micrometer to enable measuring or gauging of screw threads by the three-wire method, comprising an attachment for a micrometer including a pair of slidably adjustable holder clips having flat spring jaws, and a pair of flat-wire-carrying elements for each thread size to be measured, said elements being insertable in the jaws of said holders to be held thereby in cooperative association with the gauging elements of the micrometer.

References Cited in the file of this patent

UNITED STATES PATENTS

| Number | Name | Date |
|---|---|---|
| 2,445,402 | Malmberg | July 20, 1948 |

FOREIGN PATENTS

| Number | Country | Date |
|---|---|---|
| 583,385 | Great Britain | Dec. 17, 1946 |